United States Patent Office 2,816,111
Patented Dec. 10, 1957

2,816,111

SULFONIC ACID DERIVATIVES

Richard Wegler, Leverkusen, Ferdinand Grewe, Koln-Flittard, and Kurt Mehlhose, Leverkusen, Germany, assignors to Farbenfabriken Bayer Aktiengesellschaft, Leverkusen, Germany, a corporation of Germany No Drawing. Application February 9, 1954,
Serial No. 409,246

Claims priority, application Germany February 13, 1953

14 Claims. (Cl. 260—293.4)

The present invention relates to new derivatives of sulfonic acids, more particularly it is concerned with sulfonic acid derivatives prepared from cyclic oximides. Furthermore, the invention relates to processes for producing these new sulfonic acid derivatives.

It is well known that oximes and hydroxamic acids are reactive compounds, which can readily be reacted with carboxylic acid halides. These compounds, however, form no derivatives or only in poor yields when reacted with sulfonic acid halides.

Very surprisingly it has now been found that new and valuable sulfonic acid derivatives can be obtained by reacting cyclic oximides, i. e. compounds of the formula:

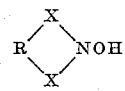

wherein R is a divalent organic radical and X a —CO—, —CS— or SO$_2$— group, with sulfonyl halides.

The organic radical R of the cyclic oximides employed in the reaction may belong to the aliphatic, aromatic or heterocyclic series. Examples of suitable oximides are succinic oximide, phthalic oximide, tetrahydrophthalic oximide, naphthalic oximide, diglycolic oximide and quinolinic oximide. Oximides of disulfonic acids or sulfocarboxylic acids, for instance of o-sulfobenzoic acid, are also suitable starting materials according to the invention. The oximides may be prepared by any conventional method, for instance by heating the acid anhydrides in hydroxylamine solution.

Suitable sulfonylhalides include compounds containing the —SO$_2$Halogen— group, for instance methanesulfochloride, chloromethanesulfochloride, trichloromethanesulfochloride, butanesulfochloride, benzosulfochloride, nitrobenzenesulfochloride, benzenedisulfochloride, chlorosulfonic acid ethylester, chlorosulfonic acid phenylester, dimethylaminosulfochloride, piperidinosulfochloride and sulfurylchloride. Instead of the sulfonic acid halides, anhydrides of sulfonic acid may be employed for carrying out the process of the invention.

According to the invention the sulfonyl halides are preferably reacted with the easily obtainable alkali or earth alkali salts of the oximides, for instance the sodium or calcium salts. The salts of tertiary amines, for instance the salts of N-dimethylcyclohexylamine or pyridine, may also be employed. It is sometimes of advantage to use the tertiary base in excess, i. e. as the solvent. The esterification proceeds very readily when carried out in the absence of water, for instance in dioxane or toluene. The process of the invention, however, may also be accomplished in the presence of water provided that the reactivity of the sulfonic acid chlorides is not too great. The completeness of the reaction can be checked by the formation of sodium chloride or aminochlorohydrate (ionogenic chlorine). In general, the process according to the invention is carried out at temperatures from about 20° C. to about 150° C., but higher and lower temperatures may be employed if desired.

In most instances the sulfonic acid derivatives obtained in accordance with the invention are well crystallized compounds. The aminosulfonic acid derivatives are distinguished by an extraordinarily good crystallization ability. Sulfonic acid derivatives prepared from alkyl sulfonic acid containing a comparatively large alkyl radical or bearing a large alkyl radical at the amino group have a low melting point or are liquid at ordinary temperature.

The new sulfonic acid derivatives of oximides, especially those prepared from aminosulfonic acids, exhibit fungicidal properties which make them useful in the control of plant diseases.

The invention is further illustrated by the following examples without being restricted thereto:

*Example 1*

168 grams of the sodium salt of tetrahydrophthaloxime (see below) are suspended with 80 cc. of benzene and vigorously stirred with 135 grams of chloromethanesulfochloride. After the mass has become transparent it is diluted while hot with 100 cc. of chlorobenzene and filtered with suction. The residue is extracted with benzene and the combined benzene solutions are evaporated. The yield amounts to 195 grams. The product melts at 81.5–82° C. after recrystallizing from ethyl acetate.

The product is active against phytophtera infestans (phyt.) and scarcely phytotoxic. When applied in a concentration of 0.0005%, 80 percent of the spores are no longer capable to germinate; 70 percent of the spores lose their germinating capability in a concentration of 0.00025%.

The sodium salt of tetrahydrophthaloxime used above is prepared by heating 600 grams of tetrahydrophthalic anhydride with 360 grams of hydroxyl ammonium chloride, 275 grams of soda and 1250 grams of water to 95–100° C. for 1½ hours. The next day the precipitated crystals are recrystallized from methanol. 450 grams of the methanol-wet product are heated in vacuum to 125° C. with stirring. The yield amounts to 360 grams; M. P. 96–98° C. The substance is converted into the sodium salt by dissolving 84 grams of oxime in 350 cc. of hot acetone and adding the solution while stirring to a sodium methylate solution (½ mol) after cooling at room temperature. The precipitated crystals are dried in vacuum at 100° C. Yield: 90 grams.

*Example 2*

216 grams of the sodium salt of phthaloxime are stirred with 200 cc. of dichlorobenzene and 175 grams of dimethylaminosulfochloride at 90° C. for 2½ hours and thereafter at 110° C. for another 2½ hours. The reaction mixture is heated with 3 liters of dioxane and then filtered. The filtrate is concentrated in vacuum and the distillate employed for extracting the residue. 175 grams of the ester of the M. P. 136–140° C. are obtained from the combined filtrates. After concentrating the mother liquor another 45 grams (M. P. 110–125° C.) are obtained; the M. P. of this portion increases to 138–142° C. by recrystallizing from dioxane. The combined esters melt at 140–141° C. after recrystallizing from benzene.

The product is active against phytophtera infestans and plasmopare viticola and is non-phytotoxic. When tested with spores in a concentration of 0.0005%, 80 percent of the spores are no longer capable to germinate; 75% of the spores lose their germinating capability if applied in a concentration of 0.00025%.

*Example 3*

34 grams of the sodium salt of phthaloxime are stirred in 85 cc. of chlorobenzene with 27.4 grams of chloromethanesulfochloride at 70° C. for 15 minutes, the reaction mixture is diluted with petroleum ether and filtered with suction when cold. 56 grams of the residue are recrystallized from ½ liter of toluene. Yield: 29 grams; M. P. 182° C.

*Example 4*

50 grams of the sodium salt of tetrahydrophthaloxime and 100 cc. of dimethylaminosulfochloride are stirred at room temperature for 15 hours and then shortly heated to 90° C. After adding 200 cc. of benzene the hot solution is filtered. The filtrate is liberated from benzene and excess sulfochloride in vacuum. The residue obtained after distillation is recrystallized twice from little benzene. Yield: 40 grams; M. P. 100° C.

*Example 5*

36 grams of the sodium salt of tetrahydrophthaloxime are suspended with little chlorobenzene and stirred with 34 grams of benzosulfochloride. The reaction is exothermic. The reaction mixture is stirred for another 15 minutes, heated to the boiling point with 200 cc. of toluene and filtered. After cooling crystals (36 grams) of the M. P. 122.5° C. are obtained from ethyl acetate.

*Example 6*

18.5 grams of the sodium salt of phthaloxime, 150 grams of chlorobenzene, 21.1 grams of 4-chlorobenzenesulfochloride are stirred at 75° C. for 5 hours. The residue is recrystallized from toluene; M. P. 181° C.

The product is not phytotoxic. When tested with spores in a concentration of 0.0005%, 75% of the spores (phyt.) are no longer capable to germinate.

*Example 7*

50 grams of the sodium salt of phthaloxime, 30 cc. of chlorobenzene, 67 grams of 3,4-dichlorobenzenesulfochloride are shortly heated to 130° C., stirred with 200 cc. of hot chlorobenzene and filtered with suction. The concentrated filtrate yields 60 grams of ester of the M. P. 136–142° C. By recrystallizing from butyl acetate 52 grams of the reaction product of the M. P. 144.5–145.5° C. are obtained.

*Example 8*

40 grams of the sodium salt of tetrahydrophthaloxime, 60 cc. of chlorobenzene, 52 grams of 3,4-dichlorobenzenesulfochloride are mixed with stirring. After the exothermic reaction is complete the mixture is stirred with 200 cc. of chlorobenzene and filtered immediately. By precipitating the filtrate with petroleum ether 55 grams of the reaction product of the M. P. 110–112° C. are obtained.

*Example 9*

50 grams of the sodium salt of tetrahydrophthaloxime, 60 cc. of chlorobenzene, 45.4 grams of diethylaminosulfochloride are stirred at 95–100° C. for 2½ hours. After cooling 200 cc. of benzene are added and the mixture is filtered. The filtrate is concentrated in vacuum after purifying with activated carbon and kieselguhr. The residue is recrystallized from ethanol. Yield: 34 grams; M. P. 68–70° C.

*Example 10*

50 grams of the sodium salt of tetrahydrophthaloxime, 40 cc. of chlorobenzene, 48.5 grams of piperidinosulfochloride are stirred at 90–95° C. for 1½ hours. After adding 300 grams of chlorobenzene and purifying with kieselguhr and activated carbon the reaction solution is concentrated. The precipitated crystals are recrystallized from carbon tetrachloride after purifying with activated carbon once more. Yield: 27 grams; M. P. 118–121° C.

*Example 11*

50 grams of the sodium salt of phthaloxime and 60 grams of diethylaminosulfochloride are heated to 90–100° C. with stirring for 12 hours. Melting point of the reaction product: 77–78° C. When tested with spores in a concentration of 0.0005%, 70% of the spores do no longer germinate.

*Example 12*

50 grams of the sodium salt of phthaloxime and 49 grams of piperidinosulfochloride are heated with 55 cc. of chlorobenzene on the water-bath for 4 days. The reaction product obtained melts at 149–150° C. When tested with spores in a concentration of 0.0005%, 90% of the spores do no longer germinate; 45% of the spores lose their germinating capability in a concentration of 0.00025%.

*Example 13*

32 grams of 3,4-dichlorobenzenesulfochloride are added in drops at 30–40° C. to 18 grams of the sodium salt of succinoxime and 30 grams of chlorobenzene with stirring and the mixture is stirred at 90–100° C. for another 15 minutes. After filtering with suction at 20° C. the residue is recrystallized from 750 grams of toluene (the sodium chloride remains undissolved). Yield: 30 grams; M. P. 148° C.

The succinoxime employed in the above reaction is prepared by dissolving 75 grams of succinic anhydride in 0.75 mol of a solution of hydroxylamine in methanol. After evaporating the solvent the product is heated to 160° C. in vacuum for 1½ hours. The reaction product is extracted with 1 liter of ethyl acetate decanted from the viscous residue, filtered and sucked off at 0° C. after cooling. 20 grams of the product are obtained; M. P. 96–98° C. The mother liquor is employed for extracting the residue. After evaporating in vacuum 27 grams of the product are obtained; M. P. 90–94° C. The combined fractions are recrystallized from a hot mixture of little propanol and benzene. Yield: 40 grams; M. P. 98–98.5° C.

*Example 14*

A mixture of 33 grams of N-dimethylcyclohexylamine and 10 cc. of chlorobenzene are added in drops at 35–40° C. to a mixture of 40.7 grams of phthaloxime, 27 cc. of chlorobenzene and 35.5 grams of dimethylaminosulfochloride with stirring and outside cooling. Before the addition of the mixture is finished the reaction product solidifies to a hard paste. The mass is transformed to a mortar and the remainder of the tertiary amine added in portions while vigorously kneading. The mixture is allowed to react at room temperature for another hour, filtered with suction and the filter-cake dried in vacuum at 55° C. After washing with water several times the product is dried over calcium chloride in vacuum. Yield: 58 grams=85% of theory; M. P. 137–140° C.

We claim:

1. A sulfonic acid derivative having the formula

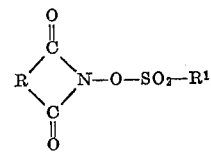

in which R stands for a divalent organic radical selected from the group consisting of a C—C linkage of a hydrocarbon chain, a C—O—C linkage of an oxahydrocarbon chain, a C—C linkage of a carbocyclic hydrocarbon ring and a C—C linkage of an aza-substituted carbocyclic hydrocarbon ring, and $R^1$ stands for the residue of a sulfonic acid.

2. A sulfonic acid derivative having the formula

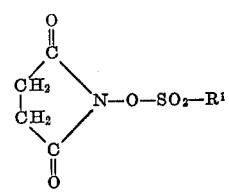

in which $R^1$ stands for the residue of a sulfonic acid.

3. Process for the production of sulfonic acid derivatives, which comprises reacting a member selected from the group consisting of cyclic oximides having the general formula

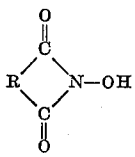

in which R stands for a divalent organic radical selected from the group consisting of a C—C linkage of a hydrocarbon chain, a C—O—C linkage of an oxahydrocarbon chain, a C—C linkage of a carbocyclic hydrocarbon ring and a C—C linkage of an aza-substituted carbocyclic hydrocarbon ring, and their salts with a sulfonyl halide.

4. Process in accordance with claim 3, in which said reaction is carried out in the presence of an inert organic solvent.

5. Process in accordance with claim 3, in which said reaction is carried out in the presence of an inert organic solvent at temperatures ranging from about 20–150° C.

6. Process in accordance with claim 3, in which the sulfonyl halide is an organic sulfonyl chloride.

7. Process in accordance with claim 3, in which the sulfonyl halide is an amino sulfonyl chloride.

8. Process in accordance with claim 3, in which said group member is a sodium salt of tetrahydrophthaloxime.

9. Process in accordance with claim 3, in which said group member is a sodium salt of phthaloxime.

10. A sulfonic acid derivative having the formula

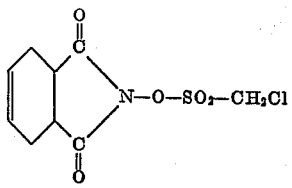

11. A sulfonic acid derivative having the formula

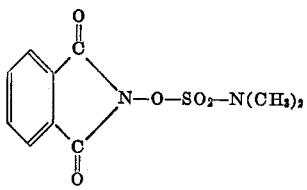

12. A sulfonic acid derivative having the formula

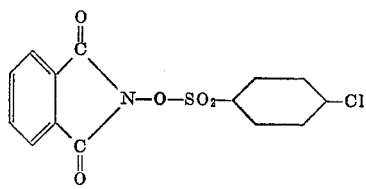

13. A sulfonic acid derivative having the formula

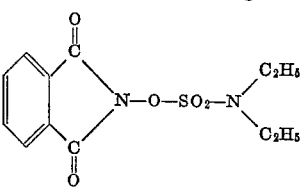

14. A sulfonic acid derivative having the formula

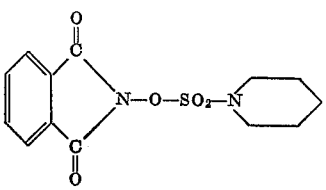

References Cited in the file of this patent
UNITED STATES PATENTS
2,373,298     Dougherty _____ Apr. 10, 1945